(12) United States Patent
Kang et al.

(10) Patent No.: US 12,481,286 B2
(45) Date of Patent: Nov. 25, 2025

(54) ROBOT, CHARGING STATION, AND ROBOT CHARGING SYSTEM COMPRISING SAME

(71) Applicant: SAMSUNG ELECTRONICS CO., LTD., Suwon-si (KR)

(72) Inventors: Sanghyun Kang, Suwon-si (KR); Dongeui Shin, Suwon-si (KR); Minhee Lee, Suwon-si (KR); Hyunsuk Kwak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 316 days.

(21) Appl. No.: 18/111,356

(22) Filed: Feb. 17, 2023

(65) Prior Publication Data
US 2023/0205220 A1 Jun. 29, 2023

Related U.S. Application Data

(63) Continuation of application No. PCT/KR2021/011996, filed on Sep. 6, 2021.

(30) Foreign Application Priority Data

Oct. 7, 2020 (KR) .................. 10-2020-0129329

(51) Int. Cl.
*G05D 1/00* (2024.01)
*B60L 53/30* (2019.01)
*B60L 53/36* (2019.01)

(52) U.S. Cl.
CPC ............ *G05D 1/0225* (2013.01); *B60L 53/30* (2019.02); *B60L 53/36* (2019.02); *G05D 1/0236* (2013.01)

(58) Field of Classification Search
CPC .... G05D 1/0225; G05D 1/0236; B60L 53/30; B60L 53/36
See application file for complete search history.

(56) References Cited

U.S. PATENT DOCUMENTS

| 6,764,373 | B1 | 7/2004 | Osawa et al. |
| 7,365,512 | B2 | 4/2008 | Kim |
| 9,393,689 | B2 | 7/2016 | Kim |

(Continued)

FOREIGN PATENT DOCUMENTS

| CN | 208375332 U | 1/2019 |
| JP | 2015535373 A | 12/2015 |

(Continued)

OTHER PUBLICATIONS

Written Opinion (PCT/ISA/237) issued Dec. 21, 2021 from the International Searching Authority to International Application No. PCT/KR2021/011996.

(Continued)

*Primary Examiner* — Tarek Elarabi
(74) *Attorney, Agent, or Firm* — Sughrue Mion, PLLC

(57) ABSTRACT

Disclosed are a robot, a charging station, and a robot charging system, the charging station including: at least one indicator; at least one reflector configured to reflect light received from the outside to the at least one indicator; an interface configured to dock an external device; and a processor that, when it is detected that the external device is docked in the interface, supplies power to the docked external device through the interface.

7 Claims, 16 Drawing Sheets

(56) References Cited

U.S. PATENT DOCUMENTS

| | | |
|---|---|---|
| 9,468,349 B2 | 10/2016 | Fong et al. |
| 9,538,892 B2 | 1/2017 | Fong et al. |
| 10,335,004 B2 | 7/2019 | Fong et al. |
| 10,394,248 B2 * | 8/2019 | Cao .................. B60L 53/36 |
| 10,613,543 B2 | 4/2020 | Won et al. |
| 10,618,653 B2 | 4/2020 | Han et al. |
| 11,188,086 B2 * | 11/2021 | Vogel ................ G05D 1/0234 |
| 2007/0018081 A1 | 1/2007 | Kim |
| 2009/0201486 A1 | 8/2009 | Cramblitt et al. |
| 2014/0100693 A1 | 4/2014 | Fong et al. |
| 2015/0115876 A1 | 4/2015 | Noh et al. |
| 2016/0143500 A1 | 5/2016 | Fong et al. |
| 2017/0105592 A1 | 4/2017 | Fong et al. |
| 2017/0177001 A1 * | 6/2017 | Cao .................... A47L 9/2805 |
| 2018/0141657 A1 | 5/2018 | Han et al. |
| 2018/0188737 A1 | 7/2018 | Won et al. |
| 2018/0246518 A1 * | 8/2018 | Vogel ................ G05D 1/0274 |
| 2021/0267426 A1 | 9/2021 | So et al. |

FOREIGN PATENT DOCUMENTS

| | | |
|---|---|---|
| KR | 1020070012117 A | 1/2007 |
| KR | 100757061 B1 | 9/2007 |
| KR | 100843806 B1 | 7/2008 |
| KR | 1020120140176 A | 12/2012 |
| KR | 1020150050161 A | 5/2015 |
| KR | 101802693 B1 | 11/2017 |
| KR | 1020180036188 A | 4/2018 |
| KR | 101873620 B1 | 7/2018 |
| KR | 1020180079054 A | 7/2018 |
| KR | 102014333 B1 | 8/2019 |
| KR | 1020190141369 A | 12/2019 |
| KR | 102118350 B1 | 6/2020 |

OTHER PUBLICATIONS

International Search Report (PCT/ISA/210) issued Dec. 21, 2021 from the International Searching Authority to International Application No. PCT/KR2021/011996.

Extended European Search Report dated Nov. 14, 2023, issued by the European Patent Office for European Patent Application No. 21877856.1.

Communication issued Dec. 12, 2024 by the Korean Intellectual Property Office in counterpart Korean Patent Application No. 10-2020-0129329.

* cited by examiner

ROBOT, CHARGING STATION, AND ROBOT CHARGING SYSTEM COMPRISING SAME

CROSS-REFERENCE TO RELATED APPLICATIONS

This application is a by-pass continuation of International Application No. PCT/KR2021/011996, filed on Sep. 6, 2021, which is based on and claims priority to Korean Patent Application No. 10-2020-0129329, filed on Oct. 7, 2020, in the Korean Intellectual Property Office, the disclosures of which are herein incorporated by reference in their entirety.

BACKGROUND

1. Field

The present disclosure relates to a robot, a charging station, and a robot charging system comprising the same, and more particularly, to a robot docking at a charging station, a charging station charging the docked robot, and a robot charging system including the same.

2. Description of Related Art

In recent years, various robots have been developed for detecting surrounding objects through lidar sensors and performing work on behalf of humans in fields such as industrial sites, medical care, space exploration, and housekeeping.

Such a robot may perform work using power supplied from a charging station, and then dock at the charging station to be charged when a charging capacity of the robot becomes less than a predetermined capacity.

To this end, the robot may recognize an indicator of the charging station for docking at the charging station, and dock at the charging station by controlling a driving direction of the robot based on the indicator of the charging station.

Meanwhile, the lidar sensor may not accurately recognize an object located at a minimum recognition distance (e.g., 265 mm) or less, and a conventional robot may thus include a camera, an ultrasonic sensor, a time of flight (ToF) sensor, or the like for recognizing the indicator of the charging station in addition to the lidar sensor.

However, in general, the camera and the ToF sensor may be expensive, and the ultrasonic sensor is unable to perform a special function other than the recognition of the indicator. There is thus a need to provide a robot which may recognize the indicator of the charging station through the lidar sensor without a separate sensor for recognizing the indicator, a charging station that makes this type of recognition possible and a robot charging system including the same.

SUMMARY

The present disclosure provides a robot which may recognize an indicator of a charging station through a lidar sensor, a charging station including at least one reflector for this type of recognition, and a robot charging system including the same.

According to an embodiment of the present disclosure, a charging station includes: at least one indicator; at least one reflector configured to reflect a light received from a source exterior to the charging station to the at least one indicator; an interface configured to dock with an external devices; and a processor configured to detect that the external device is docked with the interface and to supply power to the external device through the interface.

The charging station may also include a body, wherein the body comprises an interior, and wherein the at least one reflector is installed in the interior.

The charging station may also include a body, wherein the body comprises an interior, and the interior comprises a first region and a second region, and wherein the at least one reflector comprises a first reflector and a second reflector, the first reflector is located in the first region and is configured to reflect the light received from the source exterior to the charging station to the second reflector, and the second reflector is located in the second region and is configured to reflect the light reflected by the first reflector to the at least one indicator.

The charging station may also include a body, wherein the body comprises an interior, and the interior comprises a first region and a second region, and wherein the at least one reflector comprises a first reflector and a second reflector, the first reflector is located in the first region and is configured to reflect the light received from the source exterior to the charging station to the at least one indicator, and the second reflector is located in the second region and is configured to reflect the light received from the source exterior to the charging station to the at least one indicator. The at least one reflector may have a curved shape.

The charging station may also include a body, wherein the body comprises an interior, and the interior comprises a first region and a second region, wherein the at least one indicator comprises a first indicator located in the first region and a second indicator located in the second region, and wherein the first and second regions are located on opposite sides of the body and are configured to receive the light reflected by the at least one reflector.

According to another embodiment of the present disclosure, a robot operable to dock with a charging station comprising at least one indicator includes: a driver configured to reposition the robot; a sensor comprising a light emitter configured to irradiate a light and a light detector configured to detect the light irradiated by the light emitter and reflected back toward the robot by the at least one indicator; and a processor in communication with the driver and the sensor, wherein the processor is configured to cause the driver to reposition the robot, based on a pattern of the light reflected back toward the robot by the at least one indicator and detected by the light detector, so as to place the robot in a position to dock with the charging station.

The robot may also include a memory, wherein the memory is configured to store at least one pattern, and wherein the processor is further configured to access the at least one pattern stored in the memory, to compare the at least one stored pattern with the pattern of the light reflected back toward the robot by the at least one indicator and detected by the light detector, and based on the comparison of the at least one stored pattern with the pattern of the light reflected back toward the robot by the at least one indicator and detected by the light detector, to cause the driver to reposition the robot so as to place the robot in a position to dock with the charging station.

The robot may also include a body, wherein the driver comprises a motor connected to the body, and repositioning of of the robot so as to place the robot in a position to dock with the charging station comprises controlling the motor to move the robot relative to the charging station or to rotate the robot.

Additionally, the light detector of the robot may detect a first pattern of light irradiated by the light emitter and reflected back toward the robot by the at least one indicator and a second pattern of light irradiated by the light emitter and reflected back toward the robot by the at least one indicator, and the processor of the robot may be further configured to compare the first pattern and the second pattern and to cause the driver to reposition the robot until the first pattern and the second pattern are symmetrical to one another.

The robot may also include a memory, wherein the memory is configured to store a plurality of patterns, and wherein the processor is further configured to access the plurality of patterns and to compare the pattern of the light reflected back toward the robot by the at least one indicator and detected by the light detector with each pattern of the plurality of patterns, to determine a location of the robot relative to the charging station based on the comparison of the pattern of the light reflected back toward the robot by the at least one indicator and detected by the light detector with each pattern of the plurality of patterns, and to cause the driver to reposition the robot based on the comparison of the pattern of the light reflected back toward the robot by the at least one indicator and detected by the light detector with each pattern of the plurality of patterns so as to place the robot in a position to dock with the charging station.

The at least one indicator of the robot may include a first indicator and a second indicator, the light detector of the robot may detect a first pattern of light irradiated by the light emitter and reflected back toward the robot by the first indicator and a second pattern of light irradiated by the light emitter and reflected back toward the robot by the second indicator, and the processor of the robot may be further configured to compare the first pattern and the second pattern and to cause the driver to reposition the robot until the first pattern and the second pattern are symmetrical to one another.

According to another embodiment of the present disclosure, a robot charging system includes: a robot comprising a driver configured to reposition the robot, and a sensor comprising a light emitter and a light detector; and a charging station comprising at least one reflector and and least one indicator, wherein the light emitter is configured to irradiate a light, wherein the at least one reflector is configured to reflect the light irradiated by the light emitter to the at least one indicator, and the at least one indicator is configured to receive the light reflected by the at least one reflector and to reflect the light received from the at least one reflector outward from the charging station, wherein the light detector is configured to detect the light reflected back toward the robot by the at least one indicator, and wherein the robot is configured to cause the driver to move the robot into alignment with the charging station based on a pattern of the light irradiated by the light emitter and reflected back toward the robot by the at least one indicator and to dock with the charging station.

The charging station of the robot charging system may also include a body, wherein the body comprises an interior and the interior comprises a first region and a second region, wherein the at least one reflector comprises a first reflector and a second reflector, the first reflector is located in the first region and is configured to reflect the light emitted by the light emitter to the second reflector, and the second reflector is located in the second region and is configured to reflect the light reflected by the first reflector to the at least one indicator.

The charging station of the robot charging system may also include a body, wherein the body comprises an interior, and the interior comprises a first region and a second region, and wherein the at least one reflector comprises a first reflector and a second reflector, the first reflector is located in the first region and is configured to reflect the light emitted by the light emitter to the at least one indicator as a first pattern of light, and the second reflector is located in the second region and is configured to reflect the light emitted by the light emitter to the at least one indicator as a second pattern of light.

The robot of the robot charging system may also include a memory configured to store at least one pattern, and a processor in communication with the driver, the sensor, and the memory, wherein the processor is configured to access the at least one pattern stored in the memory, to compare the at least one stored pattern with the pattern of the light irradiated by the light emitter and reflected back toward the robot by the at least one indicator, and based on the comparison of the at least one stored pattern with the pattern of the light irradiated by the light emitter and reflected back toward the robot by the at least one indicator, to cause the driver to reposition the robot so as to place the robot in a position to dock with the charging station.

Additionally, the at least one indicator of the charging station may reflect the first pattern of light and the second pattern of light outward from the charging station, the light detector of the robot may detect the first pattern of light and the second pattern of light, and the processor of the robot may be further configured to compare the first pattern of light and the second pattern of light and to cause the driver to reposition the robot until the first pattern of light and the second pattern of light are symmetrical to one another.

The robot of the robot charging system may also include a memory configured to store a plurality of patterns, and a processor in communication with the driver, the sensor, and the memory, and the memory. Additionally, the at least one reflector of the charging station may be a curved reflector, the light detector of the robot may detect the pattern of the light irradiated by the light emitter and reflected back toward the robot by the at least one indicator, and the processor of the robot may be configured to access the plurality of patterns, to compare the pattern of the light detected by the light detector with each pattern of the plurality of patterns, to determine a location of the robot relative to the charging station based on the comparison of the pattern of the light detected by the light detector with each pattern of the plurality of patterns, and to cause the driver to reposition the robot based on the comparison of the pattern of the light detected by the light detector with each pattern of the plurality of patterns so as to place the robot in a position to dock with the charging station.

The robot of the robot charging system may also include a processor in communication with the driver and the sensor, wherein the at least one indicator comprises a first indicator and a second indicator, wherein the light detector detects a first pattern of light irradiated by the light emitter and reflected back toward the robot by the first indicator and a second pattern of light irradiated by the light emitter and reflected back toward the robot by the second indicator, and wherein the processor is further configured to compare the first pattern and the second pattern and to cause the driver to reposition the robot until the first pattern and the second pattern are symmetrical to one another.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Terms used in this specification or in the claims are selected in consideration of their function in the present disclosure. However, such terms may be changed based on the intentions of those skilled in the art to which the present disclosure pertains, legal or technical interpretations, and emergences of new technology. In addition, some terms are arbitrarily selected by the applicant, and such terms may be interpreted to have the meaning defined in this specification, and if there is no specific definition of the term, such terms may be interpreted based on the general content of this specification and common technical knowledge in the art.

Furthermore, embodiments of the present disclosure are described in detail with reference to the accompanying drawings and the contents shown in the accompanying drawings, and the present disclosure is not limited or restricted to the embodiments.

Hereinafter, the present disclosure is described in detail with reference to the accompanying drawings.

Figure 1:
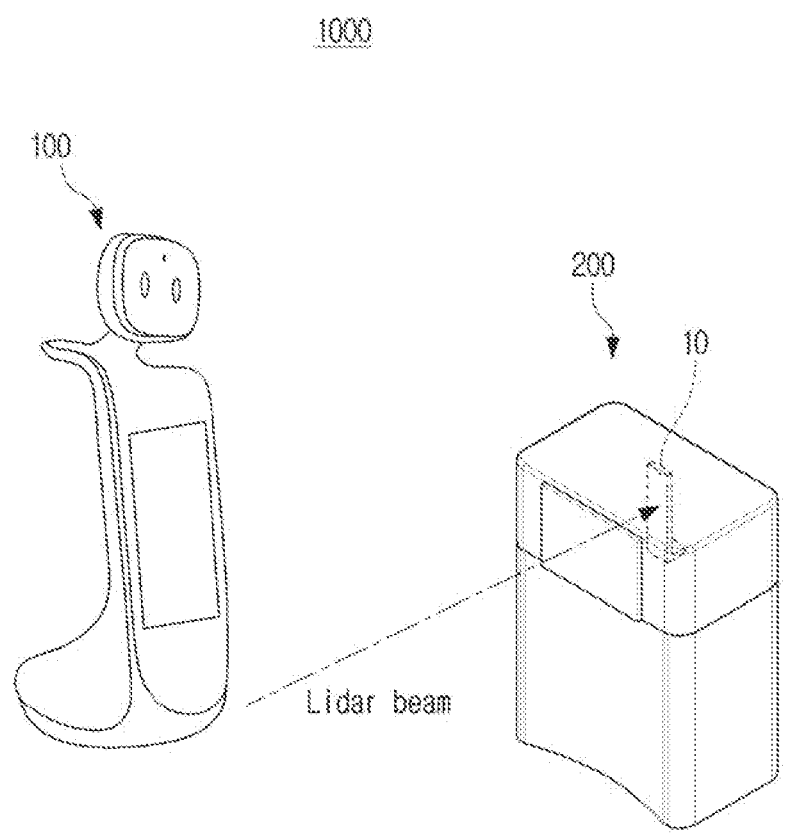
FIG. 1 is a diagram of an embodiment of a robot charging system.

FIG. 1 is a diagram of a robot charging system according to an embodiment of the present disclosure.

Referring to FIG. 1, a robot charging system 1000 according to an embodiment of the present disclosure may include a robot 100 and a charging station 200.

The robot 100 according to an embodiment of the present disclosure may be a robot which may perform air purification work while moving in a building space, a housekeeping support robot which may perform work such as organizing clothes, washing dishes or the like while moving in a house space, a robot which may demonstrate and explain a product in a store, or a security robot which may perform security while moving in a building space.

However, the robot 100 is not limited thereto, and may be implemented as any of various electronic devices which may perform work by using electric energy supplied from a battery such as an autonomous vehicle which may perform driving on behalf of a human, an automated guided vehicle which may transport goods to a destination, or a robot vacuum cleaner which may perform cleaning work while moving in a house space.

To this end, the robot 100 may include a rechargeable battery, and supply electric energy stored in the battery to various components of the robot 100. For example, the robot 100 may supply power required for driving the robot 100 to a motor connected to a driver of the robot 100, or supply power required for work such as cleaning work or transporting goods to a motor connected to a fan of the robot 100 or a motor connected to a driving part such as a robot arm or the like.

In addition, when a state of charge (SOC) of the battery reaches a predetermined value, the robot 100 may move to the charging station 200 for charging the battery and thereby receive electric energy for its charging from the charging station 200. To this end, the robot 100 may detect the state of charge (SOC) of the battery while driving. Here, the SOC of the battery may be detected by a battery management system (BMS) included in the battery, but is not limited thereto.

Meanwhile, the robot 100 may need to dock at the charging station 200 to charge the battery of the robot 100.

To this end, the charging station 200 may include an indicator 10, and the robot 100 may perform alignment for its docking on the basis of light reflected by the indicator 10 of the charging station 200.

Here, the indicator of the charging station 200 may be located inside a body of the charging station 200 as shown in FIG. 1, but is not necessarily limited thereto, and may be located outside the body of charging station 200. In addition, FIG. 1 shows the indicator 10 of a rectangular shape. However, the indicator 10 may have any of various shapes other than a rectangular shape.

Specifically, the robot 100 may irradiate light through a light emitter of a sensor for performing its docking at the charging station 200. Then, the robot 100 may compare a reflected light pattern and a pre-stored pattern when the irradiated light is reflected by the indicator 10 of the charging station 200 and received by a light detector of the sensor.

Figure 2:
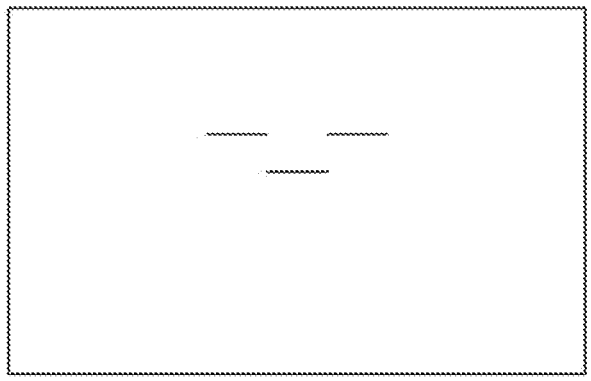
FIG. 2 is a diagram showing light reflected by an indicator according to an embodiment of the present disclosure.

As an example, light may be irradiated by the robot 100 to the indicator 10 of the charging station 200, and in this case, as shown in FIG. 2, the robot 100 may receive the light reflected by the indicator 10 and as well as light reflected by a back surface of the charging station 200 that is behind the indicator 10 through the light detector of the sensor. Here, the robot 100 may compare a pattern of the light received by the light detector of the sensor with the pre-stored pattern, and perform the alignment for a pattern matching the pre-stored pattern received by the light detector of the sensor to be received by the light detector.

Here, performing the alignment may include matching the reflected light pattern (i.e., pattern of light received by the light detector of the sensor) with the pre-stored pattern. For example, the alignment may include at least one of moving the robot so that the pattern received by the light detector of the sensor matches the pre-stored pattern by controlling the motor connected to the driver of the robot 100, or rotating the body of the robot 100 so that the pattern received by the light detector of the sensor matches the pre-stored pattern by controlling a motor connected to the body of the robot 100.

In addition, the robot 100 may control the driver of the robot 100 such that a charging unit of the robot 100 docks with the charging station 200 after performing the alignment, and robot 100 receives electric energy from the charging station 200.

In general, a robot may detect a surrounding object through a lidar sensor and perform various works on behalf of humans in fields such as industrial sites, medical care, and housekeeping. Here, the lidar sensor may include the light emitter and the light detector, and receive reflected light of the light irradiated through the light emitter through the light detector. In addition, the lidar sensor may analyze pulse power of reflected light, time until the reflected light is received after the light irradiation, the phase shift, pulse width, or the like of the reflected light to thus detect an environment around the robot 100 (e.g., shape of the object or distance to the object).

However, the lidar sensor may not accurately recognize an object located at a minimum recognition distance (e.g., 265 mm) or less, and a conventional robot may thus include a camera, an ultrasonic sensor, a time of flight (ToF) sensor, or the like for recognizing the indicator of the charging station.

Alternatively, the conventional charging station may have a width of the charging station (here, the width may be a distance from a surface of the charging station where light is first received to the indicator) made wide, thereby securing the minimum recognition distance of the lidar sensor.

However, in general, the camera and the ToF sensor may be expensive, and the ultrasonic sensor is unable to perform a special function other than the recognition of the indicator. There is thus a need to recognize the indicator of the charging station through the lidar sensor without a separate sensor for recognizing the indicator.

In addition, the charging station itself may have increased volume and weight when having the width made wide.

In an embodiment of the present disclosure, the charging station of the present disclosure may include at least one reflector. Hereinafter, the description describes a charging station 200 according to another embodiment of the present disclosure with reference to FIG. 3.

Figure 3:
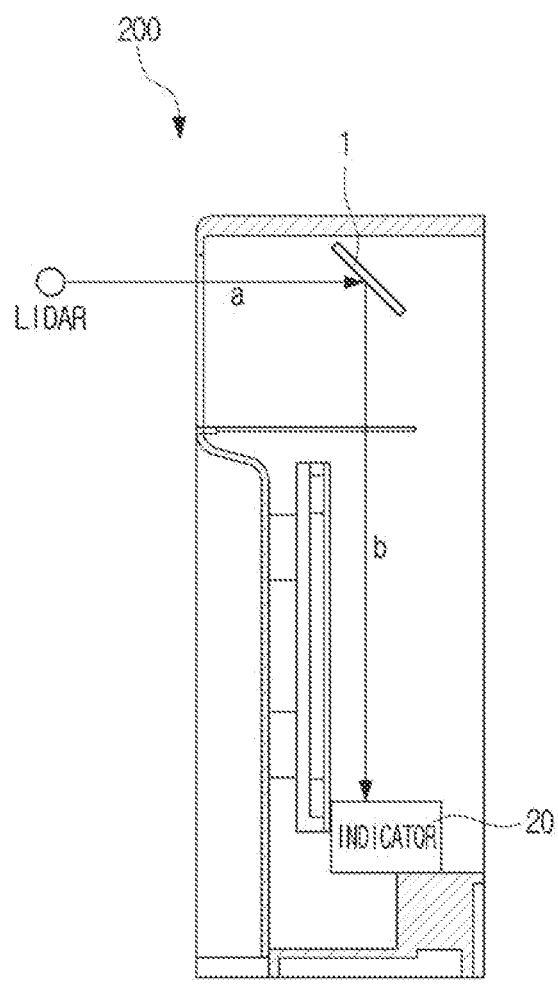
FIG. 3 is a diagram of the interior of a charging station including a reflector according to another embodiment of the present disclosure.

FIG. 3 is a diagram of the interior of a charging station 200 including a reflector 1 according to another embodiment of the present disclosure.

Referring to FIG. 3, the charging station 200 may include a reflector 1 and an indicator 20. Here, the reflector 1 may be installed at a location for receiving light irradiated from the outside of the charging station 200, and also be installed at an angle for reflecting the light irradiated from the outside to the indicator 20.

The embodiment of FIG. 3 shows that the reflector 1 and the indicator 20 are included inside the body of the charging station 200, but this is only an example. The reflector 1 may be installed outside the body of the charging station 200 when the reflector 1 is installed at a location for receiving the light irradiated from the outside and reflecting the same to the indicator 20, and the indicator 20 may also be installed outside the body of the charging station 200 when the indicator 20 is installed at a location for receiving the light reflected from the reflector 1.

In particular, the reflector 1 may be installed in a region for securing a minimum recognition distance of the lidar sensor among the plurality of regions of the charging station 200. For example, the lidar sensor may have a minimum recognition distance of 265 mm, and in this case, the lidar sensor may recognize an object located in a region that is distance of 265 mm or more away from the lidar sensor. Therefore, as shown in FIG. 3, the reflector 1 may be installed in a region where a sum of distance "a" from a surface of the charging station 200 to the reflector 1 and distance "b" from the reflector 1 to the indicator 20 may be 265 mm or more.

Figure 4:
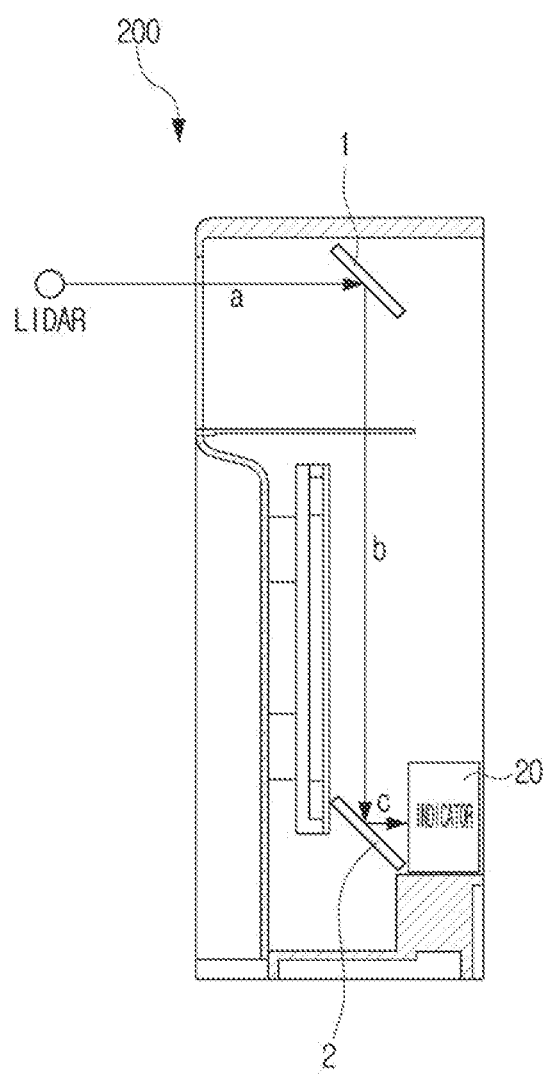
FIG. 4 is a diagram of the interior of a charging station including two reflectors according to another embodiment of the present disclosure.

In addition, for example, the present disclosure may be implemented using a plurality of reflectors. For example, referring to FIG. 4, the charging station 200 may include a first reflector 1 and a second reflector 2. Here, the first reflector 1 may be located in a first region for receiving the light irradiated from the outside, and installed at an angle for reflecting light received from the outside to the second reflector 2. In addition, the second reflector 2 may be located in a second region for receiving the light reflected by the first reflector 1, and installed at an angle for reflecting the light reflected by the first reflector 1 to the indicator 20.

Here, a sum of distance "a" from the surface of the charging station 200 to the reflector 1, distance "b" from the first reflector 1 to the second reflector 2, and distance "c" from the second reflector 2 to the indicator 20 may be the minimum recognition distance of the lidar sensor or more.

Figure 5:
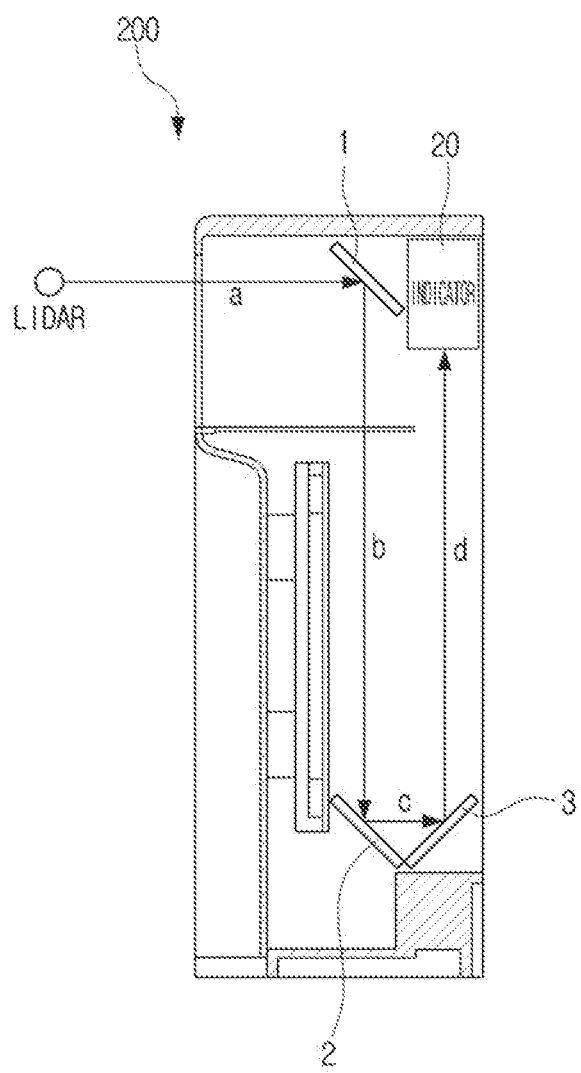
FIG. 5 is a diagram of the interior of a charging station including three reflectors according to another embodiment of the present disclosure.

The location and number of reflectors described above are an example embodiment, and the location and number of reflectors may vary. For example, as shown in FIG. 5, the charging station 200 of the present disclosure may include the first reflector 1, the second reflector 2, and a third reflector 3.

Here, the first reflector 1 may be located in the first region for receiving the light irradiated from the outside, and installed at the angle for reflecting the light received from the outside to the second reflector 2. In addition, the second reflector 2 may be located in the second region for receiving the light reflected by the first reflector 1, and installed at the angle for reflecting the light reflected by the first reflector 1 to the third reflector 3. In addition, the third reflector 3 may be located in a third region for receiving the light reflected by the second reflector 2, and installed at an angle for reflecting the light reflected by the second reflector 2 to the indicator 20.

Here, a sum of distance "a" from the surface of the charging station 200 to the reflector 1, distance "b" from the first reflector 1 to the second reflector 2, distance "c" from the second reflector 2 to the third reflector 3, and distance "d" from the third reflector 3 to the indicator 20 may be the minimum recognition distance of the lidar sensor or more.

Accordingly, in the present disclosure, the robot 100 may recognize the indicator of the charging station 200 by increasing a light travel distance by using the reflector of the charging station 200 even when a distance between the lidar sensor and the indicator is physically less than the minimum recognition distance of the lidar sensor. That is, in the lidar sensor of the conventional robot, the light reflected by the indicator and light reflected by a back surface of the charging station that is behind the indicator may form a straight line when the distance between the lidar sensor and the indicator is less than the minimum recognition distance. However, the lidar sensor of the robot in the present disclosure may receive light in a pattern as shown in FIG. 2 by increasing the light travel distance by using the reflector even when the distance between the lidar sensor and the indicator is physically less than the minimum recognition distance of the lidar sensor.

In addition, the conventional charging station may have a width made wide to secure the minimum recognition distance of the lidar sensor, whereas the charging station of the present disclosure may have a width made thinner by securing the minimum recognition distance of the lidar sensor by using at least one reflector. It is thus possible to reduce a space occupied by the charging station or a weight of the charging station.

Figure 6:
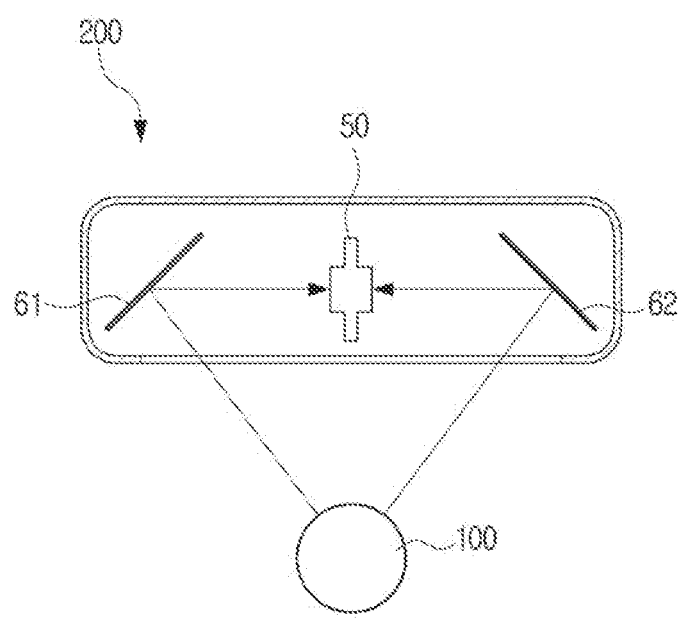
FIG. 6 is a top view of a robot irradiating light from a position in the front of a charging station which includes a plurality of reflectors according to another embodiment of the present disclosure.

FIG. 6 is a diagram showing a charging station including a plurality of reflectors according to another embodiment of the present disclosure.

FIG. 6 shows an internal configuration of the charging station 200 viewed from the top. Referring to FIG. 6, the charging station 200 according to an embodiment of the present disclosure may include a plurality of reflectors. Here, the plurality of reflectors may be a fourth reflector 61 located in a fourth region inside the body of the charging station 200 and reflecting the light received from the outside to an indicator 50, and a fifth reflector 62 located in a fifth region inside the body of the charging station 200 and reflecting the light received from the outside to the indicator 50.

To this end, the fourth reflector 61 may be installed at a location for receiving the light irradiated from the outside of the charging station 200, and installed at an angle for reflecting the light irradiated from the outside to the indicator 50. The fifth reflector 62 may also be installed at a location for receiving the light irradiated from the outside of the charging station 200, and installed at an angle for reflecting the light irradiated from the outside to the indicator 50.

In addition, as shown in FIG. 6, the fourth reflector 61 and the fifth reflector 62 may be installed to face each other.

FIG. 6 shows that the plurality of reflectors and the indicator are included inside the body of the charging station 200, however this is only an example. The plurality of reflectors may be installed outside the body of the charging station 200 when each reflector is installed at a location for receiving the light irradiated from the outside and reflecting the same to the indicator, and the indicator may also be installed outside the body of the charging station 200 when the indicator is installed at a location for receiving the light reflected from the reflectors.

In this case, the robot 100 may receive light of a first pattern that is reflected by the fourth reflector 61 and then reflected by the indicator 50 and light of a second pattern that is reflected by the fifth reflector 62 and then reflected by the indicator 50, through a light detector of the lidar sensor. Specifically, the robot 100 may receive the light of the first pattern that is reflected by the fourth reflector 61, then reflected by the indicator 50, and again reflected by the fourth reflector 61, and the light of the second pattern that is reflected by the fifth reflector 62, and then reflected by the indicator 50, and reflected again by the fifth reflector 62. It is obvious that when a front portion of the charging station is made of a material that allows light to pass through, the robot 100 may also receive the light directly reflected by the indicator 50 through the light detector of the lidar sensor.

In addition, the robot 100 may perform alignment for making the light of the first pattern and the light of the second pattern symmetrical to each other.

Figure 7:
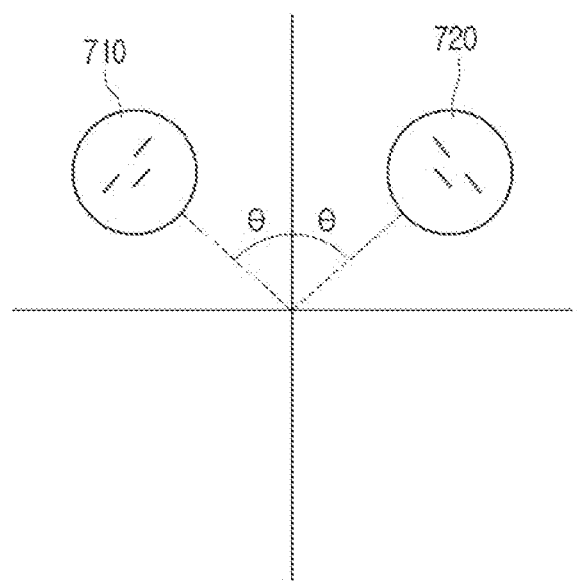
FIG. 7 is a diagram of a plurality of reflected lights obtained by the plurality of reflectors according to another embodiment of the present disclosure.

For example, the robot 100 may irradiate light to the charging station 200 from the center front of the charging station 200. In this case, as shown in FIG. 7, light 710 of the first pattern and light 720 of the second pattern, in which the patterns are symmetrical to each other across a virtual y-axis, may be received by the light detector of the lidar sensor. As such, the light 710 of the first pattern and the light 720 of the second pattern may be symmetrical to each other, and in this case, the robot 100 may dock at the charging station 200 by controlling a driver for the robot to move toward the charging station 200. The robot 100 may be parallel to the charging station 200 based on the front of the charging station 200 when the light 710 of the first pattern and the light 720 of the second pattern are symmetrical to each other across the virtual y-axis.

Figure 8:
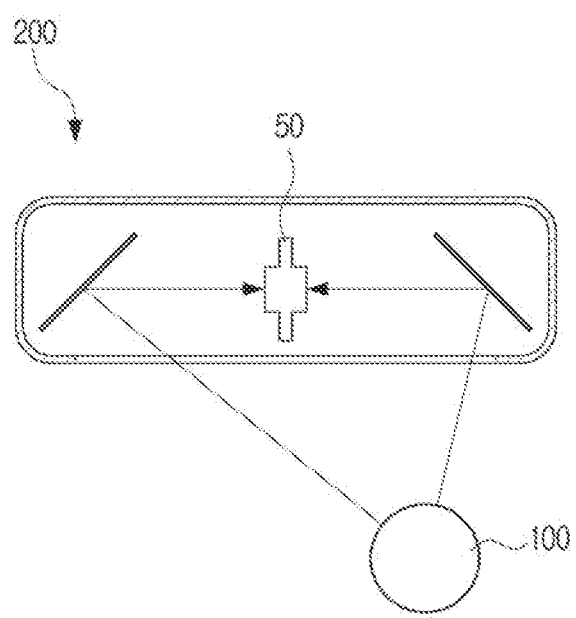
FIG. 8 is a top view of a robot irradiating light from a position toward the right front of a charging station which includes a plurality of reflectors according to another embodiment of the present disclosure.
Figure 9:
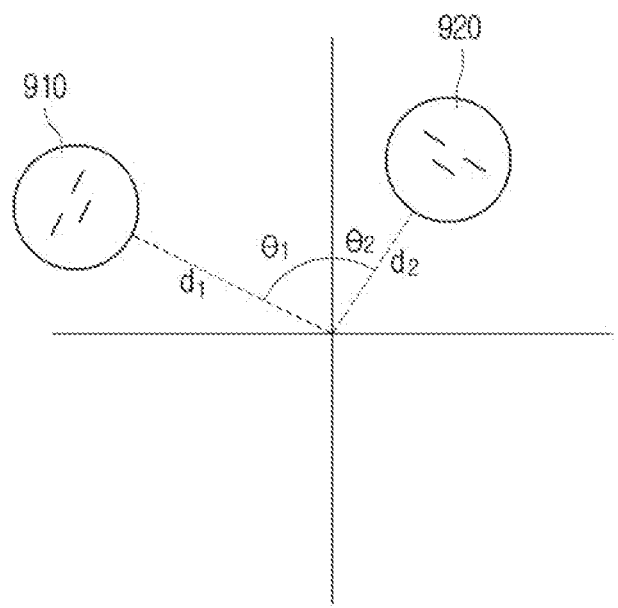
FIG. 9 is a diagram of a plurality of reflected lights obtained by a plurality of reflectors according to another embodiment of the present disclosure.

As shown in FIG. 8, it may be assumed that the robot 100 irradiates light to the charging station 200 from the right front of the charging station 200. In this case, as shown in FIG. 9, the light 710 of the first pattern and the light 720 of the second pattern asymmetrical to each other across the virtual y-axis may be received by the light detector of the lidar sensor. The reason is that the light travel distances reflected by the respective reflectors may be different from each other.

In this case, the robot 100 may perform an alignment to make light 910 of the first pattern and light 920 of the second pattern symmetrical to each other. Specifically, the robot 100 may have a distance to the indicator 50 detected on the basis of the light 910 of the first pattern that is longer than a distance to the indicator 50 detected on the basis of the light 920 of the second pattern. In this case, the robot 100 may control the driver of the robot 100 to move the robot to the left (relative to the indicator 50) until the light 910 of the first pattern and the light 920 of the second pattern are symmetrical to each other across the virtual y-axis (i.e., robot 100 will move until angle 1 and angle 2 in FIG. 9 are equal to each other, or until a difference between angle 1 and angle 2 satisfies an error range).

In addition, the robot 100 may dock at the charging station 200 by controlling the driver for the robot 100 to move toward the charging station 200 when the light 910 of the first pattern and the light 920 of the second pattern as received by the robot 100 are symmetrical to each other across the virtual y-axis.

Figure 10:
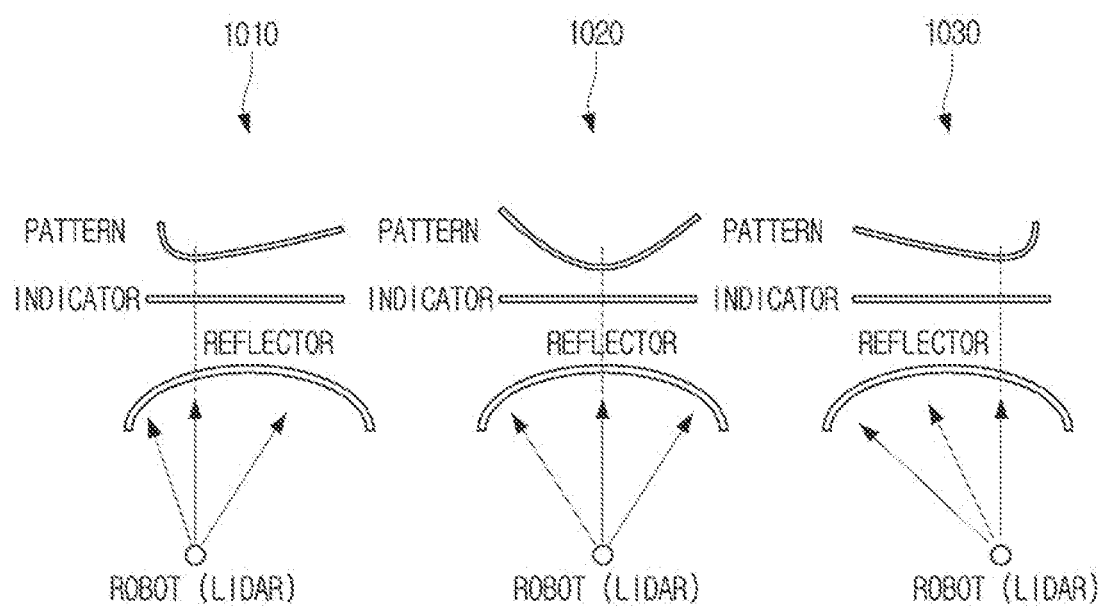
FIG. 10 is a diagram depicting an embodiment of the present disclosure wherein the reflector has a curved shape.

FIG. 10 is a diagram showing an example in which the reflector according to an embodiment of the present disclosure has a curved shape.

The reflector according to an embodiment of the present disclosure may be a reflector having a curved shape. For example, the reflector may be a reflector having a concave center region and curved left and right sides.

Accordingly, a pattern of light that is reflected by the reflector and then reflected by the indicator may have the curved shape. The reason is that the reflected light may have a curved shape, and light reflected from the reflected light to the indicator may thus have a different travel distance based on a location where the reflector receives light.

For example, the reflector 1 of FIG. 3 may be implemented as a reflector having a curved shape, and in this case, a pattern of light reflected by the reflector 1 may have a left region of a concave pattern when the robot 100 irradiates the light from the left front of the charging station 200 as shown in example 1010 of FIG. 10; the pattern of the light reflected by the reflector 1 may have the center region of the concave pattern when the robot 100 irradiates the light from the front of the charging station 200 as shown in example 1020 of FIG. 10; and the pattern of the light reflected by reflector 1 may have a right region of a concave pattern when the robot 100 irradiates the light from the right front of the charging station 200 as shown in example 1030 of FIG. 10.

In this scenario, the robot 100 may perform the alignment for docking at the charging station 200 on the basis of the curved reflected light pattern.

Specifically, the robot 100 may compare the curved reflected light pattern reflected by the indicator and a pre-stored pattern. Here, when the curved reflected light pattern does not match the pre-stored pattern, the robot 100 may perform at least one of controlling a motor connected to the driver of the robot 100 to move the robot so that a curved pattern matching the pre-stored pattern is received by the light detector of the sensor, or controlling a motor connected to the body of the robot 100 to rotate the body of the robot so that the curved pattern matching the pre-stored pattern is received by the light detector of the sensor.

Here, the pre-stored pattern may be, for example, a pattern whose center region is concave as shown in example 1020 of FIG. 10.

Meanwhile, the robot 100 may store information on a plurality of different patterns based on the relative location of the robot 100 with respect to the charging station 200, and perform the alignment on the basis of information on the reflected light patterns and the plurality of pre-stored patterns.

For example, the robot 100 may store information on a first pattern obtained when irradiating light from a first location (e.g., left front location of the charging station 200), information on a second pattern obtained when irradiating light from a second location (e.g., front location of the charging station 200), and information on a third pattern obtained when irradiating light from a third location (e.g., right front location of the charging station 200). In addition, the robot 100 may irradiate the light as a curved reflected light, and when obtaining the curved reflected light pattern, the robot 100 may thus determine information on a pattern corresponding to the curved reflected light pattern among the information on the plurality of pre-stored patterns, and then determine a location of the robot 100 on the basis of location information matching the determined pattern information. In addition, the robot 100 may perform the alignment on the basis of the location of the robot 100. For example, when determining that the robot 100 is the first location, the robot 100 may move to the right and control the driver for the robot to be located in front of the charging station 200. And when determining the robot 100 is the third location, the robot 100 may move to the left and control the driver for the robot to be located in front of the charging station 200.

As such, the charging station 200 of the present disclosure may include the reflector having a curved shape, and the robot 100 may thus recognize a distortion level of the robot 100 in relation to the charging station 200, and perform a more precise alignment.

Figure 11:
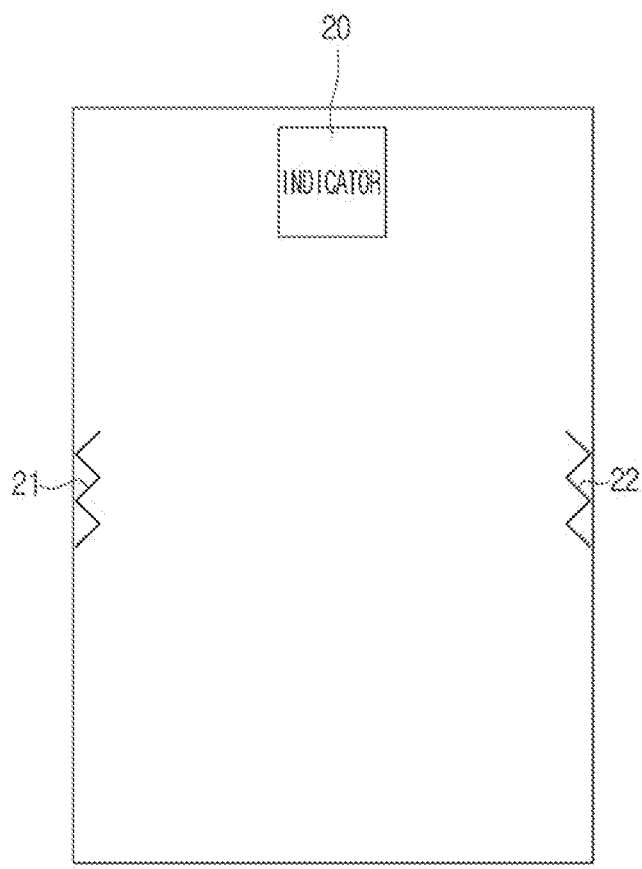
FIG. 11 is a diagram of an embodiment of a charging station including a plurality of indicators.

FIG. 11 is a view for explaining a charging station including a plurality of indicators according to another embodiment of the present disclosure.

FIG. 11 is a view showing the internal configuration of the charging station 200 viewed from the front, and omitting other configurations except for the plurality of indicators.

Referring to FIG. 11, the charging station 200 according to an embodiment of the present disclosure may further include a first indicator 21 and a second indicator 22. Here, the first indicator 21 may be located in a first region inside the body of the charging station 200, and a second indicator 22 may be located in a second region inside the body of the charging station 200. Here, the first and second regions may be regions opposite to each other. For example, as shown in FIG. 11, the first indicator 21 may be located on a left side (when viewed from the front) inside the body of the charging station 200, and the second indicator 22 may be located on a right side (when viewed from the front) inside the body of the charging station 200.

On the other hand, for example, the first indicator 21 and the second indicator 22 may be located in the opposite regions outside the body of the charging station 200.

The first indicator 21 and the second indicator 22 may have patterns symmetrical to each other. For example, referring to FIG. 11, the first indicator 21 and the second indicator 22 may each have a step-shaped pattern, but are not necessarily limited thereto.

In addition, the first indicator 21 and the second indicator 22 may each be located in a region for receiving the light reflected by the reflector.

Accordingly, after the light irradiation, the robot 100 may receive the light of the first pattern reflected by the first indicator 21 and the light of the second pattern reflected by the second indicator 22 through the light detector of the sensor.

In this case, the robot 100 may perform the alignment for making the light of the first pattern reflected by the first indicator 21 and the light of the second pattern reflected by the second indicator 22 symmetrical to each other.

Figure 12:
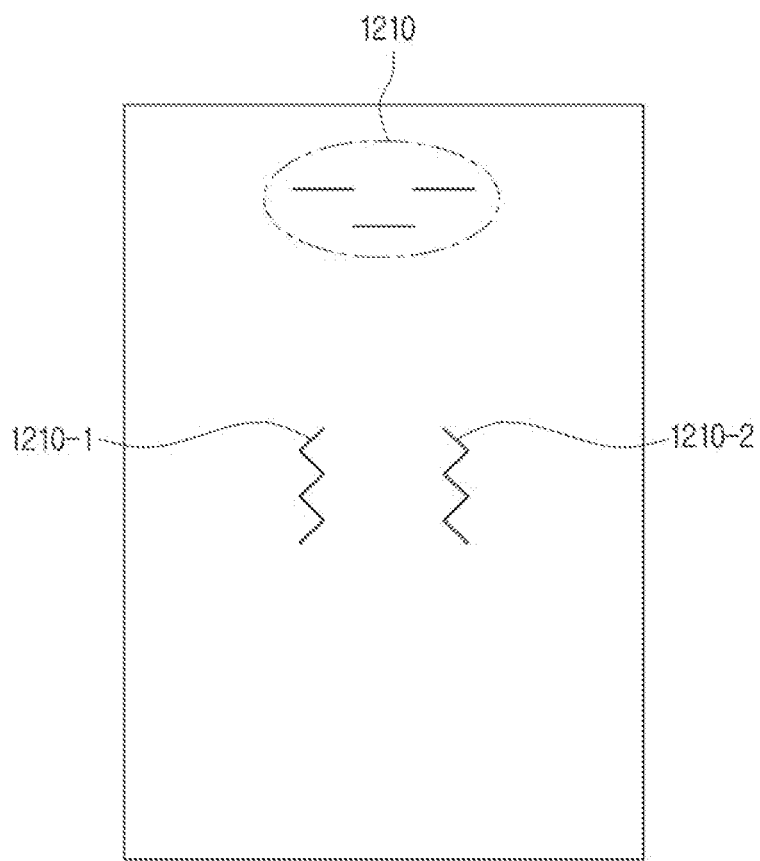
FIG. 12 is a diagram of a plurality of reflected lights obtained by a plurality of indicators according to another embodiment of the present disclosure.

Specifically, the robot 100 may be located in front of the charging station, and in this case, as shown in FIG. 12, the robot 100 may receive, through the light detector of the sensor, light 1210 reflected by the indicator 20, light 1210-1 of the first pattern reflected by the first indicator 21 and light 1210-2 of the second pattern reflected by the second indicator 22. As such, the light 1210-1 of the first pattern and the light 1210-2 of the second pattern may be symmetrical to each other across the y-axis of the center of the reflected light 1210 by the indicator 20, and in this case, the robot 100 may dock at the charging station 200 by controlling the driver to move toward the charging station 200. The reason is that the robot 100 may be seen to be located in the center front of the charging station 200.

It may be assumed that the light 1210-1 of the first pattern and the light 1210-2 of the second pattern are asymmetrical to each other across the y-axis of the center of the reflected light 1210 by the indicator 20. In this case, the robot 100 may perform the alignment so that the light 1210-1 of the first pattern and the light 1210-2 of the second pattern become symmetrical to each other. That is, the robot 100 may control the driver of the robot to move the robot until, and in such a away, as to cause the light 1210-1 of the first pattern and the light 1210-2 of the second pattern to be symmetrical to each other.

Specifically, the robot 100 may move to the right when the light 1210-1 of the first pattern and the light 1210-2 of the second pattern are asymmetrical to each other such that at least one of the light 1210-1 of the first pattern and the light 1210-2 of the second pattern is tilted to the left; and the robot 100 may move to the left when the light 1210-1 of the first pattern and the light 1210-2 of the second pattern are asymmetrical to each other such that at least one of the light 1210-1 of the first pattern and the light 1210-2 of the second pattern is tilted to the right.

As such, the charging station 200 of the present disclosure may include a plurality of indicators, the robot 100 may thus recognize the relative location of the robot 100 in relation to the charging station 200, and perform a more precise alignment.

Figure 13:
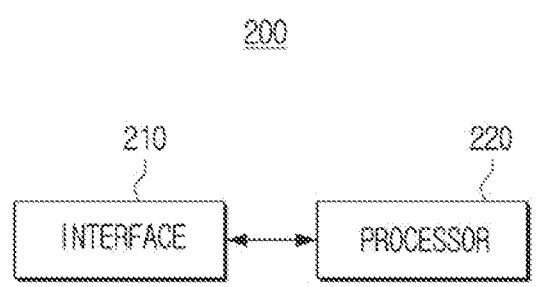
FIG. 13 is a block diagram depicting a charging station according to another embodiment of the present disclosure.

FIG. 13 is a block diagram depicting the charging station according to an embodiment of the present disclosure.

Referring to FIG. 13, the charging station 200 according to an embodiment of the present disclosure may include an interface 210 and a processor 220.

The processor 220 may control overall operations of the charging station 200. To this end, the processor 220 may include a central processing unit (CPU) or an application processor (AP). In addition, the processor 220 may be implemented as at least one general processor, a digital signal processor, a system on chip (SoC), a microcomputer (MICOM), or the like.

The processor 220 may detect docking of an external device. Here, the external device may be the robot 100 described above. Specifically, the processor 220 may detect that the external device performs the docking when a current of a threshold value or more is detected by the interface 210 as the external device docks at the interface 210 of the charging station. In addition, when detecting the docking of the external device, the processor 220 may control a power supply unit to supply power to the external device through a charging terminal of the interface 210.

To this end, the charging terminal of the interface 210 may be connected to a terminal electrically connected to a battery of the external device.

The configuration of FIG. 13 is an example, and the charging station 200 may further include a display for displaying a mode (e.g., charging standby mode or charging mode) of the charging station, an input unit for receiving a power on/off command or a charging start command, or the like.

Figure 14:
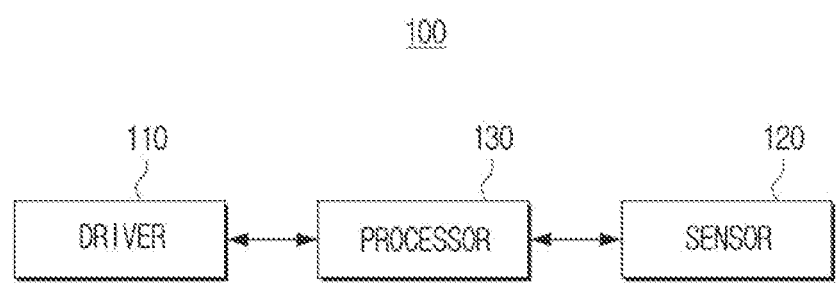
FIG. 14 is a block diagram depicting a robot according to still another embodiment of the present disclosure.

FIG. 14 is a block diagram of the robot according to an embodiment of the present disclosure.

Referring to FIG. 14, the robot 100 may include a driver 110, a sensor 120, and a processor 130.

The driver 110 may control movement of the robot 100. To this end, the driver 110 may be connected to the bottom of a body of the robot 100.

The driver 110 of the present disclosure may include a driving part implemented as wheels or robot legs, a motor, and a micro controller unit (MCU). The processor 130 may transmit a control signal for moving the robot 100 to a MCU of the driver 110. In this case, the MCU of the driver may move the robot 100 by outputting a driving signal and transmitting the same to the motor connected to the driving part based on the control signal.

The sensor 120 is a component that detects an object near the robot 100 and/or a distance to the object, and may be, for example, a lidar sensor. Here, the lidar sensor may include a light emitter and a light detector, and receive, through the light detector, reflected light of light irradiated through the light emitter. In addition, the lidar sensor may analyze pulse power of reflected light, time until the reflected light is received after the light irradiation, the phase shift, pulse width, or the like of the reflected light to thus detect an environment around the robot 100 (e.g., shape of the object or distance to the object).

The processor 130 may control overall operations of the robot 100. To this end, the processor 130 may include a central processing unit (CPU) or an application processor (AP). In addition, the processor 130 may be implemented as at least one general processor, a digital signal processor, a system on chip (SoC), a microcomputer (MICOM), or the like.

The processor 130 may perform alignment of the robot for its docking at the charging station 200 on the basis of a reflected light pattern when light irradiated to the charging station 200 by the light emitter of the sensor 120 is reflected by an indicator of the charging station 200 and then received by the light detector of the sensor. Here, the light irradiated by the light emitter of the sensor 120 may be reflected by at least one reflector of the charging station 200 and then reflected by the indicator. That is, the light irradiated by the light emitter of the sensor 120 may be reflected by the reflector of the charging station 200, then reflected by the indicator or reflected by the plurality of reflectors of the charging station 200, and then reflected by the indicator.

Accordingly, the robot may recognize the indicator of the charging station through the reflector of the charging station even when the lidar sensor of the robot 100 and the charging station 200 are physically located within a minimum recognition distance of the lidar sensor.

Meanwhile, performing the alignment may include matching the reflected light pattern with a pre-stored pattern. To this end, the processor 130 may control a motor connected to the driver 110 to move the robot 100, or may control a motor connected to the body of the robot 100 to rotate the robot.

In addition, the processor 130 may control the driver 110 for the robot 100 to dock at the charging station 200 after performing the alignment.

In this way, the minimum recognition distance of the lidar sensor may be secured through the reflector, and the charging station may thus be manufactured to have a thin and compact design, thereby reducing a space occupied by the charging station or a weight of the charging station.

The description hereinabove describes that a sensor of the present disclosure is implemented as the lidar sensor. However, the sensor of present disclosure may be implemented as any of various sensors such as an infrared sensor or an ultrasonic sensor. For example, the sensor of the present disclosure may be implemented as the infrared sensor. In this case, the charging station 200 may include the reflector in a location for securing a minimum recognition distance of the infrared sensor, and the robot 100 may detect a surrounding object, recognize the indicator of the charging station 200, or the like through the infrared sensor.

Figure 15:
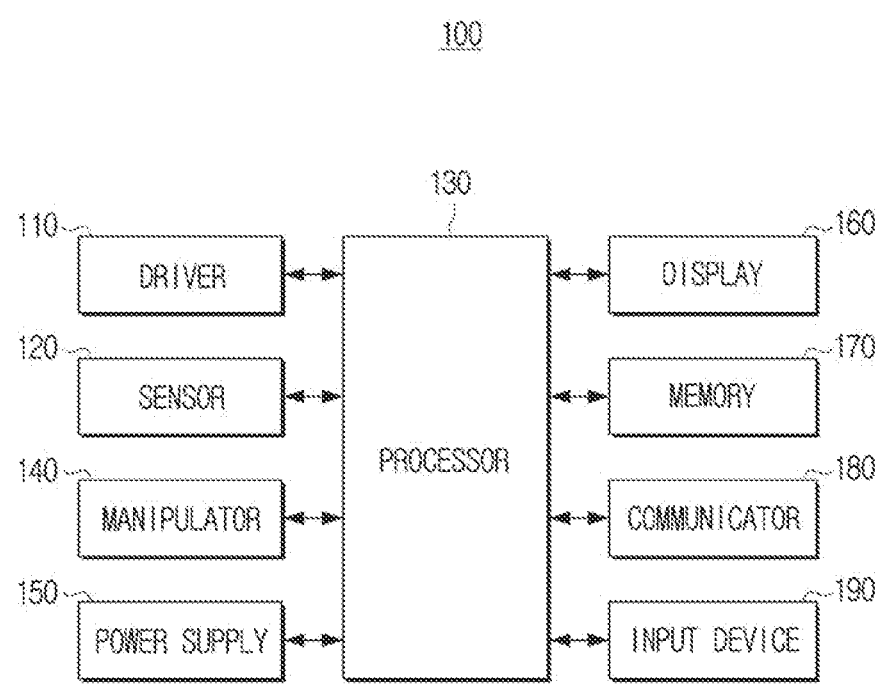
FIG. 15 is a detailed block diagram depicting a robot according to still another embodiment of the present disclosure.

FIG. 15 is a detailed block diagram for explaining the robot according to still another embodiment of the present disclosure.

Referring to FIG. 15, the robot 100 according to an embodiment of the present disclosure may include the driver 110, the sensor 120, a manipulator 140, a driver 150, a power supply 150, a display 160, a memory 170, a communicator 180, an input device 190, and the processor 130. Hereinafter, the description omits or abbreviates portions overlapping the above description.

The manipulator 140 may be a component including, for example, a robot arm, a robot hand, and a robot finger, and here, one end of the robot arm may be connected to the body of the robot 100, and the other end of the robot arm may be connected to the robot hand. In addition, the robot hand may be connected to the robot finger, and a plurality of robot fingers may be implemented.

The manipulator 140 of the present disclosure may further include the micro controller unit (MCU) and a plurality of motors. Here, the plurality of motors may include a motor for controlling the robot arm, a motor for controlling the robot hand, and a motor for controlling the robot finger, and each of the plurality of motors may be electrically connected to the MCU and the power supply 150.

In addition, the MCU may be electrically connected to the processor 130 of the body, and may drive at least one of the plurality of motors on the basis of the control signal received from the processor 130. For example, the MCU may control movement of the robot arm by outputting the driving signal and transmitting the same to the motor connected to the robot arm when receiving a signal for controlling the movement of the robot arm from the processor 130.

Meanwhile, the MCU may be included in the robot arm, but it not necessarily limited to this configuration, and mat, for example, also be included in the robot hand.

In addition, the above-described motor(s) may be a direct current (DC) motor, but is not limited thereto, and may be implemented as any of various motors which may generate a rotational force, such as a step motor or an RC servomotor.

The power supply 150 may supply electric energy to each component included in the robot 100. The power supply 150 may include a battery, and the battery of the power supply 150 may be charged by the charging station 200. To this end, a charging terminal of the battery may be electrically connected to a power supply terminal of the charging station 200.

The display 160 may display various screens. For example, the display 160 may display information on a state of charge (SOC) of the battery, information indicating that the battery is being charged, and the like.

As such, the display 160 may be implemented as any of various types of displays such as a liquid crystal display (LCD), a light emitting diode (LED), an organic light emitting diode (OLED), a liquid crystal on silicon (LCoS), and a digital light processing (DLP). In addition, the display 160 may also include a driving circuit, a backlight unit, and the like, which may be implemented in a form such as a-si thin film transistor (TFT), a low temperature poly silicon (LTPS) TFT, an organic TFT (OTFT), and the like.

In addition, the display 160 may be implemented as a touch screen by being combined with a touch sensor.

The memory 170 may store an operating system (OS) for controlling overall operations of components of the robot 100, and instructions or data related to the components of the robot 100.

Accordingly, the processor 130 may control the plurality of hardware or software components of the robot 100 by using various instructions or data stored in the memory 170, load and process instructions or data received from at least one of other components into a volatile memory, and store various data in a non-volatile memory.

In particular, the memory 170 may store information on a reflected light pattern. Here, the reflected light pattern may be used for aligning the robot 100 and the charging station 200. In addition, the reflector of the charging station 200 may be a curved reflector, and in this case, the memory 170 may store information on a plurality of patterns different for each location of the robot 100 with respect to the charging station 200.

The communicator 180 may communicate with an external device to transmit/receive various data. For example, the communication unit 180 may not only communicate with an electronic device through a local area network (LAN), an internet network, and a mobile communication network, but also communicate with the electronic device through various communication methods such as Bluetooth (BT), Bluetooth low energy (BLE), wireless fidelity (WI-FI), Zigbee, and near field communication (NFC).

To this end, the communicator 180 may include various communication modules for performing network communication. For example, the communicator 150 may include a Bluetooth chip, a Wi-Fi chip, a wireless communication chip, and the like.

The input device 190 may receive various user commands. The processor 130 may execute various functions based on a user command input through the input device 190.

To this end, the input device 190 may be implemented as an input panel. The input panel may be implemented in the form of a touch pad, or a keypad or a touch screen that includes various function keys, number keys, special keys, character keys, and the like.

Meanwhile, the description hereinabove separately describes the embodiments with reference to the respective drawings. However, any one embodiment may be implemented in combination with another embodiment. For example, the charging station 200 of the present disclosure may include at least one reflector as shown in one of FIGS. 3 to 5, and may also include the plurality of reflected lights for reflecting the light to the indicator as shown in FIG. 6.

Figure 16:
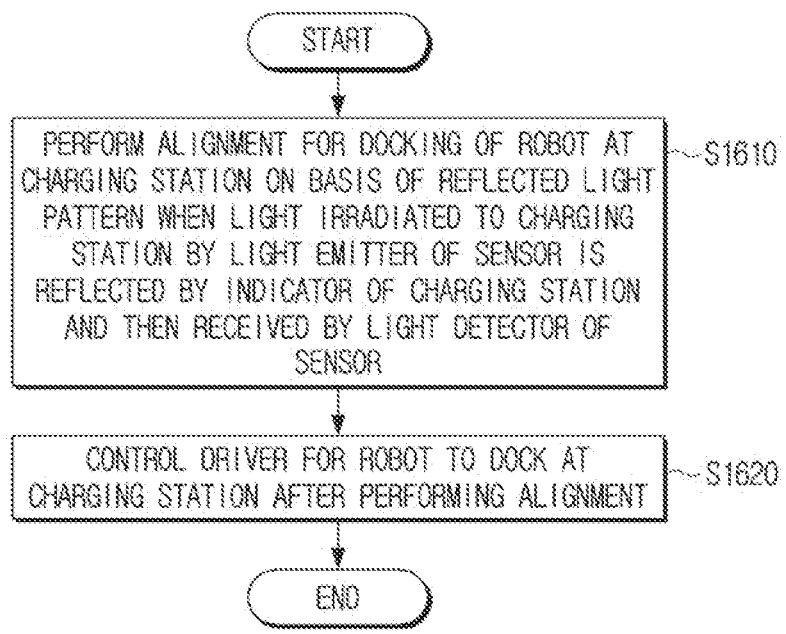
FIG. 16 is a flow chart describing a method for controlling a robot according to yet another embodiment of the present disclosure.

FIG. 16 is a flow chart showing a method for controlling a robot according to an embodiment of the present disclosure.

A robot 100 may perform alignment for its docking at a charging station 200 on the basis of a reflected light pattern when light irradiated to the charging station 200 by a light emitter of a sensor is reflected by an indicator of the charging station 200 and then received by a light detector of the sensor (S1610).

Here, the light irradiated by the light emitter of the sensor may be reflected by at least one reflector of the charging station 200 and then reflected by the indicator. For example, the charging station 200 may include a first reflector located in a first region and a second reflector located in a second region, inside the charging station, and the light irradiated by the light emitter of the sensor may be reflected to the second reflector by the first reflector, and the light reflected to the second reflector may be reflected to the indicator by the second reflector.

The robot 100 may perform the alignment for matching the reflected light pattern with a pre-stored pattern. To this end, the robot 100 may match the reflected light pattern with the pre-stored pattern by controlling a motor connected to a driver to move the robot, or controlling a motor connected to a body of the robot to rotate the robot.

In an embodiment, a fourth reflector may be located in a fourth region inside the charging station, a fifth reflector may be located in a fifth region, and the fourth and fifth reflectors may reflect light received from the outside to the indicator. In this configuration, the robot 100 may receive light of a first pattern reflected by the fourth reflector and then reflected by the indicator and light of a second pattern reflected by the fifth reflector and then reflected by the indicator, through the light detector of the sensor, and perform the alignment for making the light of the first pattern and the light of the second pattern symmetrical to each other.

In an embodiment, when the reflected light is a curved reflected light, the robot 100 may determine a location of the robot 100 that corresponds to the reflected light pattern on the basis of the reflected light pattern and information on the plurality of patterns different based on the relative location of the robot 100 with respect to the charging station 200, and perform the alignment for matching the reflected light pattern with the pre-stored pattern on the basis of the location of the robot 100.

In addition, a first indicator may be located in a first region inside the charging station 200, a second indicator may be located in a second region opposite to the first region, and the first indicator and the second indicator receive the light. In this case, the robot 100 may receive the light of the first pattern reflected by the first indicator and the light of the second pattern reflected by the second indicator, through the light detector of the sensor, and perform the alignment for making the light of the first pattern and the light of the second pattern symmetrical to each other.

In addition, the robot 100 may control the driver for the robot to dock at the charging station after performing the alignment (S1620).

The methods according to the various embodiments of the present disclosure described above may be implemented in the form of software or applications which may be installed in a conventional robot.

In addition, the methods according to the various embodiments of the present disclosure described above may be implemented through software upgrade or hardware upgrade of a conventional robot.

In addition, the various embodiments of the present disclosure described above may be performed through an embedded server positioned in the robot, or a server positioned outside the robot.

Provided is a non-transitory computer readable medium that stores a program sequentially performing the method for controlling a robot according to the present disclosure.

Meanwhile, the non-transitory computer readable medium is not a medium that stores data therein for a while, such as a register, a cache, a memory, or the like, and indicates a medium that semi-permanently stores data therein and is readable by a device. Specifically, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

In addition, although the embodiments of the present disclosure have been illustrated and described hereinabove, the present disclosure is not limited to the specific embodiments described above, and may be variously modified by those skilled in the art to which the present disclosure pertains without departing from the scope and spirit of the present disclosure as claimed in the claims. These modifications should also be understood to fall within the technical spirit and scope of the present disclosure.

The invention claimed is:

1. A robot charging system comprising:
a robot comprising a driver configured to reposition the robot, and a sensor comprising a light emitter and a light detector; and
a charging station comprising at least one reflector and at least one indicator,
wherein the light emitter is configured to irradiate a light,
wherein the at least one reflector is configured to reflect the light irradiated by the light emitter to the at least one indicator, and the at least one indicator is configured to receive the light reflected by the at least one reflector and to reflect the light received from the at least one reflector outward from the charging station,
wherein the light detector is configured to detect the light reflected back toward the robot by the at least one indicator, and
wherein the robot is configured to cause the driver to move the robot into alignment with the charging station based on a pattern of the light irradiated by the light emitter and reflected back toward the robot by the at least one indicator and to dock with the charging station,
wherein the robot is configured to perform the alignment for docking at the charging station based on a reflected light pattern when the light irradiated to the charging station is reflected by the at least one indicator of the charging station and then received by the robot and dock at the charging station after performing the alignment, and
wherein the robot is configured to perform the alignment for matching the reflected light pattern with a pre-stored pattern.

2. The robot charging system of claim 1,
wherein the charging station further comprises a body, wherein the body comprises an interior and the interior comprises a first region and a second region, and
wherein the at least one reflector comprises a first reflector and a second reflector, the first reflector is located in the first region and is configured to reflect the light emitted by the light emitter to the second reflector, and the second reflector is located in the second region and is configured to reflect the light reflected by the first reflector to the at least one indicator.

3. The robot charging system of claim 1,
wherein the charging station further comprising a body, wherein the body comprises an interior, and the interior comprises a first region and a second region, and
wherein the at least one reflector comprises a first reflector and a second reflector, the first reflector is located in the first region and is configured to reflect the light emitted by the light emitter to the at least one indicator as a first pattern of light, and the second reflector is located in the second region and is configured to reflect the light emitted by the light emitter to the at least one indicator as a second pattern of light.

4. The robot charging system of claim 3,
wherein the robot further comprises a processor in communication with the driver and the sensor,
wherein the at least one indicator reflects the first pattern of light and the second pattern of light outward from the charging station,
wherein the light detector detects the first pattern of light and the second pattern of light, and
wherein the processor is further configured to compare the first pattern of light and the second pattern of light and to cause the driver to reposition the robot until the first pattern of light and the second pattern of light are symmetrical to one another.

5. The robot charging system of claim 1, wherein the robot further comprises a memory configured to store at least one pattern, and a processor in communication with the driver, the sensor, and the memory, and
wherein the processor is configured to access the at least one stored pattern, to compare the at least one stored pattern with the pattern of the light irradiated by the light emitter and reflected back toward the robot by the at least one indicator, and based on the comparison of the at least one stored pattern with the pattern of the light irradiated by the light emitter and reflected back toward the robot by the at least one indicator, to cause the driver to reposition the robot so as to place the robot in a position to dock with the charging station.

6. The robot charging system of claim 1,
wherein the robot further comprises a memory configured to store a plurality of patterns, and a processor in communication with the driver, the sensor, and the memory,
wherein the at least one reflector comprises a curved reflector,
wherein the light detector detects the pattern of the light irradiated by the light emitter and reflected back toward the robot by the at least one indicator, and
wherein the processor is configured to access the plurality of patterns, to compare the pattern of the light detected by the light detector with each pattern of the plurality of patterns, to determine a location of the robot relative to the charging station based on the comparison of the pattern of the light detected by the light detector with each pattern of the plurality of patterns, and to cause the driver to reposition the robot based on the comparison of the pattern of the light detected by the light detector with each pattern of the plurality of patterns so as to place the robot in a position to dock with the charging station.

7. The robot charging system of claim 1,
wherein the robot further comprises a processor in communication with the driver and the sensor,
wherein the at least one indicator comprises a first indicator and a second indicator,
wherein the light detector detects a first pattern of light irradiated by the light emitter and reflected back toward the robot by the first indicator and a second pattern of light irradiated by the light emitter and reflected back toward the robot by the second indicator, and
wherein the processor is further configured to compare the first pattern and the second pattern and to cause the driver to reposition the robot until the first pattern and the second pattern are symmetrical to one another.

* * * * *